United States Patent [19]

Gordon et al.

[11] Patent Number: 4,991,893

[45] Date of Patent: Feb. 12, 1991

[54] MANHOLE COVER LIFTING DEVICE

[75] Inventors: Russell B. Gordon; Jimmy A. Gordon, both of Atlantic Beach; Bill Beach, Jacksonville, all of Fla.

[73] Assignee: Saddle Vent, Inc., Atlantic Beach, Fla.

[21] Appl. No.: 236,415

[22] Filed: Aug. 25, 1988

[51] Int. Cl.[5] .......................... B65G 7/12; B66F 11/00

[52] U.S. Cl. ....................................... 294/17; 254/129; 254/131

[58] Field of Search ........................ 294/11, 12, 15–17, 294/26, 82.1, 82.11, 93; 81/3.55, 3.57; 254/16, 17, 44, 114, 116, 119–121, 129–131, 133 R

[56] References Cited

U.S. PATENT DOCUMENTS

| | | | |
|---|---|---|---|
| 118,097 | 8/1871 | Blake et al. | 294/15 |
| 139,029 | 5/1873 | Smith | 294/15 |
| 141,906 | 8/1873 | Whittier | 294/17 |
| 300,968 | 6/1884 | Hatfield | 254/131 X |
| 763,249 | 6/1904 | Blanchet | 294/17 |
| 824,041 | 6/1906 | Pilliner | 294/17 X |
| 1,096,378 | 5/1914 | Lawrence | 294/17 X |
| 1,317,145 | 9/1919 | Skantz | 254/120 |
| 1,775,093 | 9/1930 | Hemrich | 254/131 |
| 1,815,220 | 7/1931 | Strong | 254/131 |
| 1,933,384 | 10/1933 | Moylan | 294/17 |
| 2,086,318 | 7/1937 | Jackson | 294/17 X |
| 2,211,062 | 8/1940 | King | 294/17 |
| 2,348,978 | 5/1944 | Kinner | 294/17 X |
| 2,832,628 | 4/1958 | Turnbull | 294/17 |
| 2,846,259 | 8/1958 | Sadler | 294/15 |
| 2,852,228 | 9/1958 | Latiolais | 254/131 |
| 3,029,502 | 4/1962 | Middaugh | 254/129 |
| 3,678,561 | 7/1972 | Mautz, Sr. | 254/131 |
| 3,744,758 | 7/1973 | Nakasone | 254/129 |
| 3,883,117 | 5/1975 | Powell | 254/131 |
| 4,076,217 | 5/1976 | Haller | 254/131 |
| 4,181,290 | 1/1980 | Affolter | 254/131 |
| 4,334,669 | 6/1982 | Ross | 254/120 |
| 4,482,182 | 11/1984 | Mortensen | 294/15 |
| 4,492,132 | 1/1985 | Obey | 81/3.57 |

FOREIGN PATENT DOCUMENTS

| | | | |
|---|---|---|---|
| 78166 | 2/1951 | Norway | 254/131 |
| 2171352 | 8/1986 | United Kingdom | 294/15 |

*Primary Examiner*—Johnny D. Cherry

*Attorney, Agent, or Firm*—Nixon & Vanderhye

[57] ABSTRACT

A manhole cover lifting tool is provided which includes a lever having a handle end and a working end, wherein a first tool head is mounted on the working end, the first tool head including a pair of optionally usable manhole cover lifting tools. A second tool head is provided with a substantially identical pair of optionally usable manhole cover lifting tools, the second tool head being operatively connected to a sleeve freely slidably mounted on the lever by means of a fixed length flexible chain extending between the second tool head and the sleeve.

17 Claims, 2 Drawing Sheets

MANHOLE COVER LIFTING DEVICE

BACKGROUND AND SUMMARY OF THE INVENTION

The present invention relates to an improved manhole cover lifting tool. More specifically, the invention relates to a lever-type manual tool for lifting and maneuvering manhole covers of various sizes away from respective manholes, wherein a freely slidable sleeve mounted on the lever permits a virtually infinite range of adjustments of the distance between the fulcrum and the sleeve, thereby enabling the tool to be used with any size manhole cover while maximizing the available leverage.

There are a number of manhole cover lifting devices disclosed in the prior art. For example, in U.S. Pat. No. 4,076,217, a lever is combined with scissors-type lifting means for lifting a manhole cover and pivoting the raised cover away from the manhole in a horizontal plane.

In U.S. Pat. No. 4,181,290, a lever-type manhole cover lifting tool is combined with a hydraulic jack, hydraulic cylinder, or pulley cable to facilitate lifting of the cover and thereafter pivoting the cover away from the manhole.

In U.S. Pat. Nos. 4,482,182; 2,846,259; 2,832,628; and 2,086,318, manually operated lever-type lifting tools are disclosed in which one or more points of attachment for a member connected to the manhole cover are fixed along the length of the lever. In the '259 and '628 patents, flexible chains are connected between the selected, fixed points of attachment on the lever and lifting elements attached to the manhole cover. However, because the attachment points are fixed, the chain must be adjustable in length to accommodate manhole covers of different diameter This arrangement is unsatisfactory since it is not possible to maximize leverage, and additional hardware is often required to insure secure attachment of the chain links to the various fixed points of attachment.

Manhole cover diameters are typically 22", 24" or 26". Increasingly, however, even larger manhole covers of up to 30" diameter are being utilized, particularly to facilitate ingress and egress of personnel into the manhole. Accordingly, there is a need for a manhole cover lifter tool which is simple and easy to use, which maximizes leverage, and which accommodates all of the above manhole cover sizes.

The present invention provides a simplified and easily manipulable tool for lifting manhole covers of various diameters and which allows the user to maximize available leverage.

In one exemplary embodiment, the invention includes an elongated lever having one free end which comprises a handle, and another free end which comprises a working end, to which is attached a first tool head. The tool head itself is provided with a pair of alternatively useable manhole cover lifting tools. The choice of lifting tool is determined by the shape of an aperture or slot typically provided in manhole covers for lifting purposes. A second tool head is provided at one end of a flexible chain and includes alternatively usable tools substantially identical to those of the first tool head. The chain is attached at its other end to a sleeve which is slidably mounted on the lever. In the present invention, the flexible chain has a single, fixed, length, i.e., the length is not intended to be adjusted for manhole covers of different diameter. Rather, the freely slidable sleeve performs the function of adapting the device to manhole covers of different diameters while at the same time, permitting maximum leverage to be applied during lifting.

In the present invention, the manhole cover lifting tools are first engaged within the appropriate slots, apertures or the like provided in the manhole cover, with the sleeve being adjusted along the length of the lever to the extent necessary to allow attachment of one of the lifting tools of the second tool head to the manhole cover. Thereafter, the sleeve may be slidably adjusted along the length of the lever until the chain is taut and the lever is at an angle of inclination which is most comfortable for the user, and/or which maximizes the available leverage, i.e., by moving the sleeve as far as possible toward the fulcrum.

Once the lifting operation has commenced, the sleeve frictionally binds against the lever, and effectively prevents any further sliding movement of the sleeve during the lifting operation.

In a further aspect of the invention, the unused tool fixed to the first tool head at the working end of the lever serves as the fulcrum point by which the manhole cover is lifted and subsequently pivoted substantially horizontally away from the manhole.

Further objects and advantages of the present invention will become apparent from the detailed description of the invention which follows below.

DETAILED DESCRIPTION OF THE DRAWINGS

Figure 2:
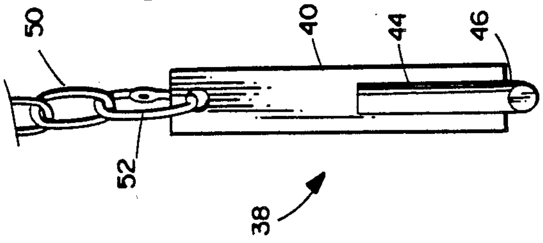
FIG. 2 is a partial, front view of the tool head portion of the tool illustrated in FIG. 1.
Figure 3:
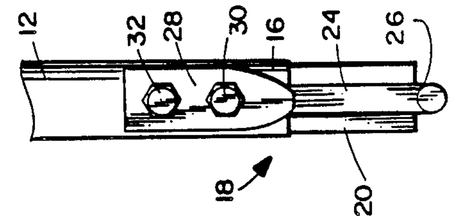
FIG. 3 is a partial, front view of a second tool head portion illustrated in FIG. 1.
Figure 1:
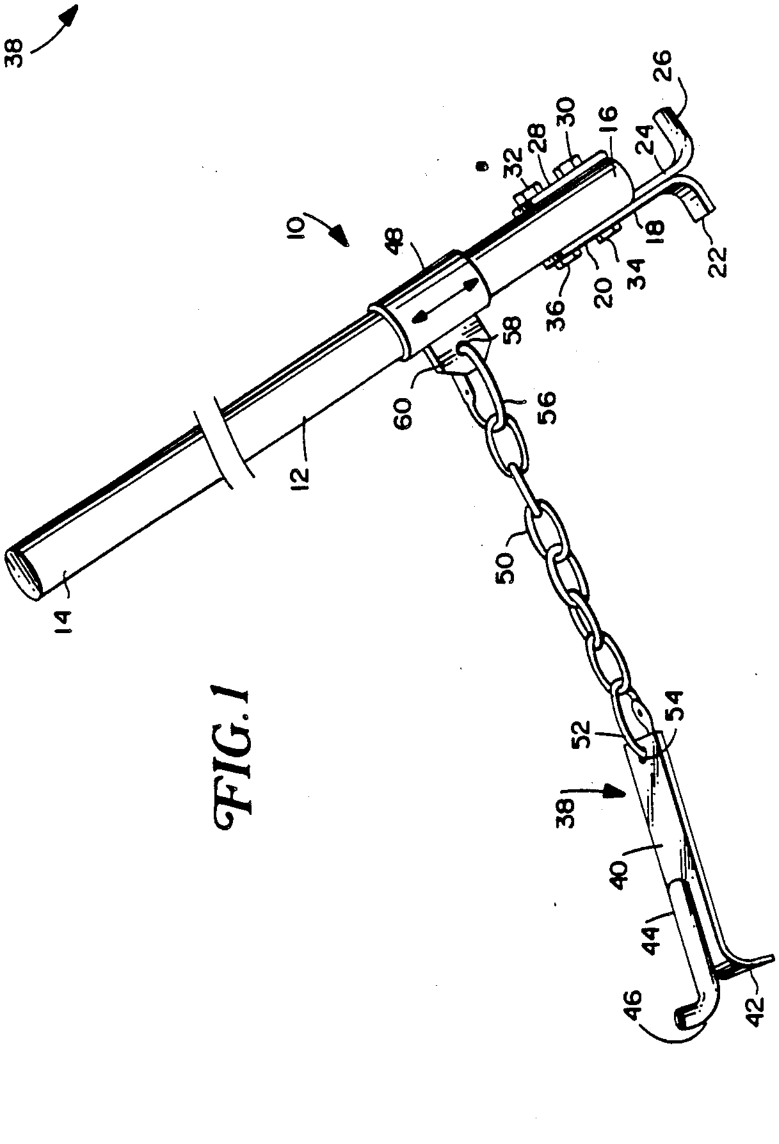
FIG. 1 is a partial, perspective view of the tool in accordance with the invention.

Referring now to FIG. 1, the manhole cover lifting tool 10 in accordance with one exemplary embodiment of this invention includes an elongated lever 12 having one free end 14 comprising a handle, and a second free end 16 comprising a working end, and to which is attached a first tool head 18. The tool head 18 includes a rigid metal strip 20, having a rectangular cross-section, and provided at one free end with a curved hook portion 22 which constitutes a first manhole cover lifting tool. A rigid length of round metal stock 24 is secured, preferably by welding, to the tool head 18 and is also provided with a curved hook portion 26 which constitutes a second manhole cover lifting tool. It will be understood that the stock 24 in the area where it is welded to the strip 20 may be flattened somewhat in order to obtain a larger surface contact area with the strip 20 and thereby obtain a stronger weld.

The respective hook portions 22, 26 lie in back-to-back relationship and extend away from each other in substantially opposite directions. A reinforcing bracket 28 is located diametrically opposite the strip 20 on the lever and is utilized to mount the tool head 18 and associated manhole cover lifting tools 22, 26 to the forward end of the elongated lever 12 by means of nuts and bolts 30, 32, 34 and 36, or other suitable means.

A second tool head 38 includes a rigid metal strip 40, similar to strip 18, provided at one free end with a hook portion 42 which is substantially identical to the hook portion 22. Thus, hook 42 constitutes a third manhole cover lifting tool. A rigid length of round metal stock 44 is welded or otherwise secured to strip 40 in the same manner as round metal stock 24 is secured to strip 20. Stock 44 is curved at one free end to provide a hook portion 46 which constitutes a fourth manhole cover lifting tool. As in the case of the above described first and second manhole cover lifting tools, the hook elements 42, 46 lie in back-to-back relationship facing in opposite directions.

The second tool head 38, and its associated manhole cover lifting tools 42, 46, are operatively connected to a substantially cylindrical sleeve 48 slidably mounted on the lever 12 between the handle and working ends. Specifically, a fixed length flexible chain 50 is connected at one end to the tool head 38 by means of a connector ring 52 received within an aperture 54 provided at the rearward end of the strip 40. The other end of the chain is connected to the sleeve 48 by means of a connector ring 56 received in an aperture 58 provided in a radially extending flange 60 which is welded or otherwise secured to the sleeve 48.

Figure 4:
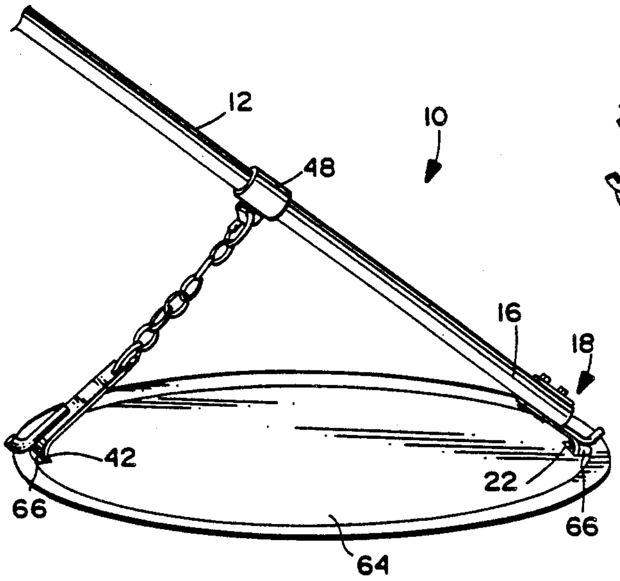
FIG. 4 is a partial perspective view showing the manhole cover lifting tool of this invention in engagement with a larger diameter manhole cover.

The lifting tools 22, 26 and 42, 46 are designed for use with manhole covers having differently shaped holes, slots, etc. usually located at or near the peripheral edge of the manhole cover, and diametrically opposite each other. For example, some manhole covers, such as cover 64 shown in FIG. 4 are provided with diametrically opposite U-shaped slots 66, in which case the first and third tools 22, 42 are appropriate. Other manhole covers may be provided with circular apertures (not shown), and, in this case, second and fourth tools 26, 46 are designed especially for use therewith.

Figure 5:
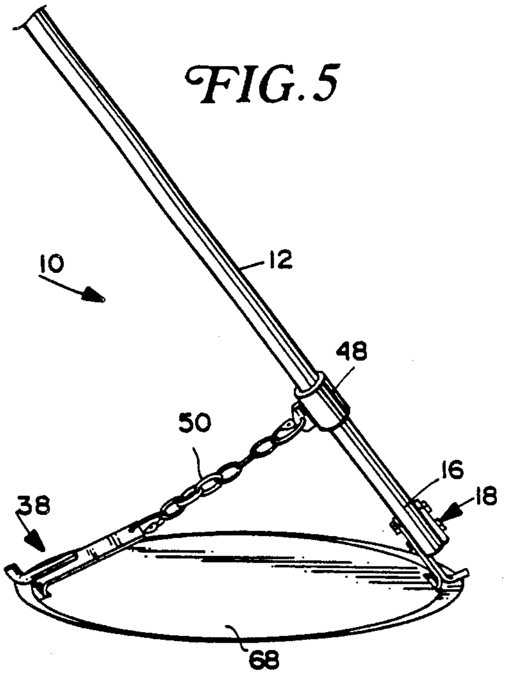
FIG. 5 is a partial perspective view showing the manhole cover lifting tool of this invention in engagement with a smaller manhole cover.

Because the sleeve 48 is freely slidable along the elongated lever 12, the lateral spacing between first and second tool heads 18 and 38 may be adjusted to accommodate various diameter covers. For example, FIG. 4 illustrates the lifting tool 10 of this invention in engagement with a relatively large manhole cover 64, while FIG. 5 illustrates the same tool 10 in engagement with a relatively smaller manhole cover 68. It will be seen that, for the larger cover 64, the sleeve 48 is spaced further from the tool head 18 than for the smaller cover 68. Thus, unlike some prior art tools which employ adjustable length chains with one or more fixed points of attachment, the present invention utilizes a fixed length chain 50 in combination with a virtually infinitely adjustable sleeve.

This simplified arrangement eliminates the need for additional chain locking means, which may be required with adjustable length chains, reduces the time needed for adjustment, and provides a virtually fail-safe and easy-to-use tool. At the same time, after attachment of one of the tools 42, 46 to the manhole cover, the sleeve 48 may be moved toward the tool head 18, which serves as the fulcrum for the lever 10, to maximize the available leverage.

In use, two of the manhole cover engaging tools 22 and 42, or 26 and 46, are located within the apertures or slots provided in the manhole cover. In doing so, sleeve 48 is permitted to slide along the lever to the extent necessary to accommodate the diameter of the cover. It will be appreciated that, as the cover diameter increases, the sleeve is moved further toward the handle portion of the lever, and the lever assumes a less inclined orientation relative to horizontal. Once the tools are engaged, with the manhole cover, the sleeve may be moved as desired, within a limited range, to provide an angle of inclination most suited to the user, or moved toward the fulcrum to the extent possible to thereby maximize the available leverage.

As the cover is lifted, it will be appreciated that the frictional engagement of the sleeve relative to the lever 12 increases to the point where the sleeve remains substantially stationary during the lifting operation.

Figure 6:
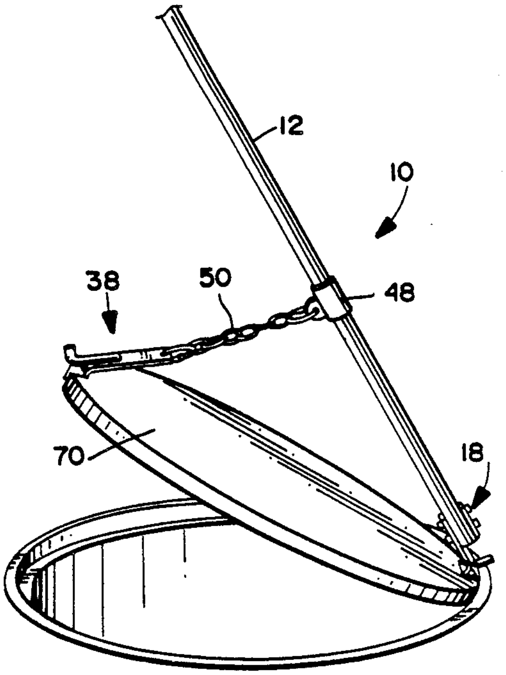
FIG. 6 is a partial perspective view of the manhole cover lifting tool of this invention shown in engagement with a manhole cover in a lifted position.

It will be further appreciated that when hooks 22 and 42, for example, are engaged in the slots 66 of a manhole cover, the unused hook element 26 engages the ground and serves as the fulcrum of the lever-type tool. In addition, when the manhole cover 70 is lifted to the extent shown in FIG. 6, it is a simple matter to pivot or "walk" the cover away from the manhole, using the tool 26 as the pivot axis.

The lever 12 of the manhole cover lifting tool of this invention is preferably constructed of wood or metal pipe stock, while the lifting tools 22, 26, 42, 46 are preferably constructed of hardened steel or like material. Sleeve 48 is likewise preferably constructed of a metal such as steel.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A manhole cover lifting device for lifting a manhole cover having at least two lifting holes or slots therein comprising an elongated lever provided at one end with a first manhole cover lifting means fixed to the lever for engagement with a first of said slots or holes, and at the other end with a manually engageable handle; a sleeve freely slidably mounted on the elongated lever between said ends, and a second manhole cover lifting means for engagement with a second of said slots or holes operatively connected to said sleeve by a flexible member, wherein said sleeve is freely slidable along said elongated lever to accommodate manhole covers of various diameters and to maximize available leverage.

2. A manhole cover lifting device as defined in claim 1 wherein said flexible member comprises a chain.

3. A manhole cover lifting device as defined in claim 1 wherein said first manhole cover lifting means comprises a first tool head including a first pair of alternatively useable hook elements.

4. A manhole cover lifting device as defined in claim 3 wherein said second manhole cover lifting means comprises a second tool head including a second pair of alternatively useable hook elements.

5. A manhole cover lifting device as defined in claim 4 wherein said hook elements in each of said first and second pair of alternatively useable hook elements are in back-to-back relationship, facing in opposite directions.

6. A manhole cover lifting device as defined in claim 3 wherein the hook element of the first pair of alternatively useable hook elements not in use in a lifting operation comprises a fulcrum for the lifting device.

7. A manhole cover lifting device as defined in claim 1 wherein said sleeve includes means for connecting said sleeve to said flexible member.

8. A manhole cover lifting device comprising an elongated lever provided at one end with a first manhole cover lifting tool, and at the other end with a manually engageable handle; a sleeve freely slidably mounted on the elongated lever between said ends, and a second manhole cover lifting tool operatively connected to said sleeve; wherein said sleeve is freely adjustable along said elongated lever to accommodate manhole covers of various diameters and to maximize available leverage;

wherein said first manhole cover lifting tool comprises a first tool head including a first pair of alternatively useable hook elements; and further wherein said first pair of alternatively useable hook elements includes a first relatively flat strip, formed with a hook at one end, and fastened to the elongated lever at the other end, and a first substantially round rod formed with a hook at one end fastened to the first relatively flat strip at the other end.

9. A manhole cover lifting device as defined in claim 8 wherein said second manhole cover lifting tool comprises a second tool head including a second pair of alternatively useable hook elements, said second pair of alternatively useable hook elements includes a second relatively flat strip, formed with a hook at one end and operatively fastened to said sleeve at the other end, and a second substantially round rod formed with a hook at one end and fastened to the second relatively flat strip at the other end.

10. A manhole cover lifting device for lifting a manhole cover having at least two lifting holes or slots therein comprising an elongated lever and a pair of manhole cover lifting means for engaging said at least two holes or slots, one of said lifting means fixed to one end of the lever and the other of said lifting means fixed to a flexible member extending between the other of said lifting means and a sleeve mounted on said elongated lever, wherein said one of said lifting means includes fulcrum means for facilitating lifting of the manhole cover, and wherein said device is adapted to lift covers of various diameters but wherein, for any of said covers of various diameters, the distance between the other of said lifting means and the sleeve remains substantially constant.

11. A manhole cover lifting device as defined in claim 10 wherein said one of the lifting means includes a first hook for engaging a first of said at least two slots or holes provided in the manhole cover, and wherein said other of the lifting means includes a second hook for engaging a second of said at least two slots or holes provided in the manhole cover.

12. A manhole cover lifting device as defined in claim 10 wherein said sleeve is freely movable along the lever.

13. A manhole cover lifting device as defined in claim 12 wherein said flexible member comprises a chain of fixed length.

14. A manhole cover lifting device as defined in claim 13 wherein said one of the lifting means includes a first hook for engaging a first of said at least two slots or holes provided in the manhole cover and wherein said other of the lifting means includes a second hook for engaging a second of said at least two slots or holes provided in the manhole cover.

15. A manhole cover lifting device as defined in claim 10 wherein each of said pair of manhole cover lifting means comprises a pair of alternatively usable manhole cover lifting tools.

16. A manhole cover lifting device as defined in claim 15 wherein one of said alternatively usable manhole cover lifting tools comprises said fulcrum means.

17. A manhole cover lifting device for lifting a manhole cover provided with a pair of diametrically opposed holes or slots comprising an elongated lever having a handle end and a working end, a first tool head mounted on said working end and including a first pair of alternatively useable manhole cover lifting tools for engaging one of said pair of holes or slots; a second tool head including a second pair of alternatively usable manhole cover lifting tools for engaging the other of said pair of holes or slots, such that, in use, the lifting tool of said first pair of lifting tools not engaged in one of said pair of holes or slots comprises a fulcrum for facilitating lifting of the manhole cover; a sleeve freely slidably mounted on said lever intermediate the handle and working ends; and a fixed length flexible chain extending between said second tool head and said sleeve, whereby said device may be used to lift manhole covers of various diameters with maximum leverage.

* * * * *